US005589638A

United States Patent [19]
Glaser et al.

[11] Patent Number: 5,589,638
[45] Date of Patent: Dec. 31, 1996

[54] PRESSURE SENSOR HAVING A HEAT CONDUCTING ELEMENT BETWEEN THE PRESSURE TRANSMITTING ELEMENT AND THE PRESSURE SENSOR HOUSING

[75] Inventors: Josef Glaser, Graz; Pierre Fornet, Leibnitz, both of Austria

[73] Assignee: AVL Gesellschaft Für Verbrennungskraftmaschinen und Messtechnik m.b.H. Prof.Dr.Dr.h.c. Hans List, Graz, Austria

[21] Appl. No.: 655,463

[22] Filed: May 30, 1996

[30] Foreign Application Priority Data

Jun. 2, 1995 [AT] Austria ................................. A950/95

[51] Int. Cl.⁶ ............................................. G01L 7/00
[52] U.S. Cl. ................................. 73/706; 73/756
[58] Field of Search ................ 73/706, 756, 715, 73/861.47, 708

[56] References Cited

U.S. PATENT DOCUMENTS 3,857,287 12/1974 Sonderegger et al. ................ 73/706
4,399,706  8/1983 List et al. ................................. 73/706

FOREIGN PATENT DOCUMENTS 292337 8/1971 Austria .

Primary Examiner—Richard Chilcot
Assistant Examiner—William L. Oen
Attorney, Agent, or Firm—Watson Cole Stevens Davis, P.L.L.C.

[57] ABSTRACT

In a pressure sensor with a housing containing a measuring device which is separated from the housing by a radial gap and comprises a pressure transmitting element, a measuring element, and, if required, a tubular spring for axially pre-loading the measuring element, and with a sealing membrane tightly and flexibly connecting housing and pressure transmitting element on the side of the medium, the proposal is put forward that at least one heat conducting element be provided between the pressure transmitting element and the housing, which element should be made from material of good thermal conductivity and have a large cross-section for heat conduction, such that most of the heat arising in the region of the pressure transmitting element is carried off to the housing via the heat conducting element, the latter acting as bending or rolling element in the instance of axial shifts between the pressure transmitting element and the housing, and being flexible in axial direction to minimize the transmission of forces.

6 Claims, 2 Drawing Sheets

PRESSURE SENSOR HAVING A HEAT CONDUCTING ELEMENT BETWEEN THE PRESSURE TRANSMITTING ELEMENT AND THE PRESSURE SENSOR HOUSING

BACKGROUND OF THE INVENTION

The present invention relates to a pressure sensor with a housing containing a measuring device which is separated from the housing by a radial gap and comprises a pressure transmitting element, a measuring element, and, if required, a tubular spring for axially preloading the measuring element, and with a sealing membrane tightly and flexibly connecting housing and pressure transmitting element on the side of the medium.

Sensors for measuring pressures in hot processes, which are in direct contact with the measuring medium, are subject to large quantities of heat coming from the measuring medium. If a sensor does not contain its own cooling system flowing through the sensor and carrying off heat more or less directly at the site where it arrives, the entire quantity of heat must flow through the sensor into the wall that is already hot, which will lead to very high temperatures in individual parts of the sensor, in particular in the vicinity of the hot medium.

DESCRIPTION OF THE PRIOR ART

FIG. 1, which presents the usual configuration of such sensors clearly shows the problems of heat transfer. The heat W flowing from the measuring medium into the sensor must flow off into the bore 1 in the wall of the pressure chamber. Partial heat flows in the centre of the sensor arriving via the pressure transmitting element 2 and the central zones of the membrane 3, will have to surmount a relatively strong heat flow resistance resulting from the possible heat transfer paths through the thin membrane 3 on the one hand and the measuring element 4 with its generally poor thermal conductivity on the other hand. For this reason the pressure transmitting element 2 usually is the hottest component in uncooled sensors. Via the membrane 3 and measuring element 4 large temperature gradients will result vis-a-vis the adjoining regions of the housing 6.

Due to the tasks they have to fulfill, the two components, i.e., membrane 3 and measuring element 4, are not readily turned into good heat conducting elements. To ensure its proper function as a sealing element, the membrane must be made of material that is very soft and thin (to permit relative movement between measuring stack and housing), yet strong (high pressure demands material of high strength), resistant to chemicals (in the instance of aggressive media), and smooth. The main function of the measuring element, on the other hand, is to perfectly convert pressure or force into an electric signal. Strong heat flows or high temperatures will inevitably interfere with this process, even if the measuring element is able to withstand them, as the measuring properties always are temperature-dependent. In both elements any design permitting strong heat flows within these elements will have a negative effect on optimum function and measuring accuracy.

Another element that is frequently used in piezoelectric sensors, is the preloading spring 5, which will ensure that the piezoelements press firmly against each other. The preloading spring should be configured as a low-mass, elastic component with matching thermal expansion properties, i.e., a thin cylinder tubular spring that is exclusively subject to tension. This component also is characterized by poor thermal conductivity which can only be improved by such common measures as enlarging the component cross-section, or the use of some other material at the expense of other sensor properties, which would deteriorate as a consequence (for example, larger stresses on the measuring element when the sensor is heated). Such a pressure sensor is disclosed in AT 292 337 B, for example.

SUMMARY OF THE INVENTION

It is the object of this invention to improve a pressure sensor without an external cooling system so as to minimize the amount of heat flowing into the measuring element from the pressure transmitting element.

In the invention this object is achieved by arranging for at least one heat conducting element to be provided between the pressure transmitting element and the housing, which should be made from material of good thermal conductivity and have a large cross-section for heat conduction, such that most of the heat arising in the region of the pressure transmitting element can be carried off to the housing via the heat conducting element, the latter acting as bending or rolling element in the instance of axial shifts between the pressure transmitting element and the housing, and being flexible in axial direction as regards force transmission. Since the main function of the heat conducting element will be the transfer of heat, it may be optimized for this task, i.e., made of material with very high thermal conductivity.

Copper materials, for instance, have a thermal conductivity that is 10–20 times higher than that of conventional materials employed for membranes or spring tubes, but are poorly suited for such purposes on account of their comparatively low mechanical strength or corrosion resistance and very high thermal expansion.

If additional heat conducting elements are to be used, the only thing to be borne in mind is that relative movements will take place between the housing and the measuring stack due to thermal expansion and deformations of the mounting site, which should occur as force-free as possible. For this purpose the heat conducting elements must be "soft" or flexible with regard to such movements. The materials used in this context need not feature any special mechanical strength, corrosion resistance or matching thermal expansion properties. The invention proposes the use of elements which in the instance of relative movement between housing and pressure transmitting element, i.e., in the direction of the sensor axis, are essentially subject to bending stresses, or even will just roll between housing and pressure transmitting element, i.e., which in any case are not exclusively subject to tension or compression stresses like the tubular spring.

BRIEF DESCRIPTION OF THE DRAWINGS

The invention will be further described with reference to the accompanying drawings in which.

DETAILED DESCRIPTION OF PREFERRED EMBODIMENTS

Figure 1:
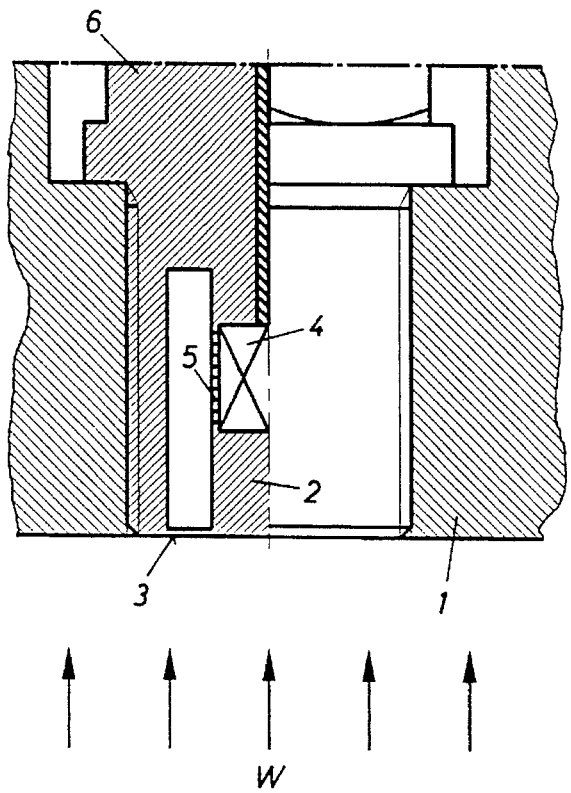
FIG. 1 shows a state-of-the-art sensor as described in the opening paragraphs, FIG. 2 a sensor according to the invention, with variants in FIGS. 2A to 2F, and views from above of variants of the heat conducting element in FIGS. 2C* to 2F*, FIG. 3 another variant with a detail shown in FIG. 3A.
Figure 2:
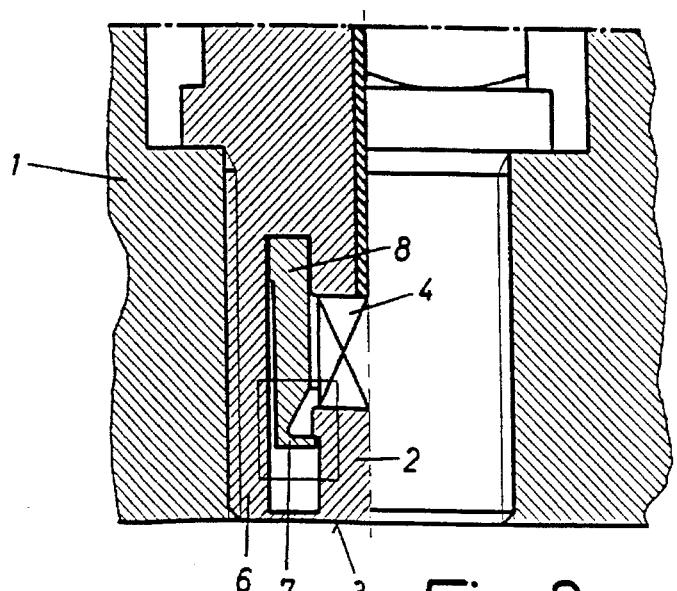

In FIG. 2 the heat conducting element 7, which is flexible in axial direction, is provide with an additional, rigid heat conducting element 8, which is of cylindrical shape and may be made integral with element 7, and which serves to transfer the excess heat to cooler regions of the housing 6 of the sensor.

Figure 2A:
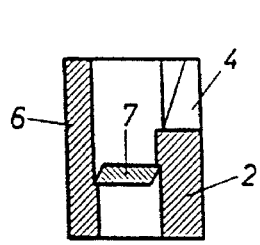
Figure 2B:
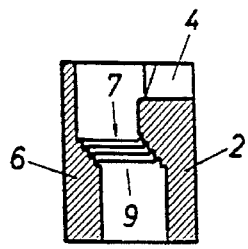
Figure 2D:
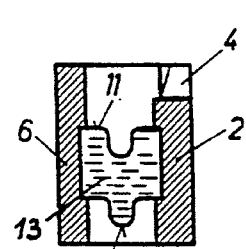

The use of flexible elements for heat conduction will permit to reduce the rigidity to almost zero, by distributing their overall thickness determined by the required heat conducting cross-section of thermal conductivity over a growing number of increasingly thin sheet-like elements 9 (FIG. 2B).

Figure 2C:
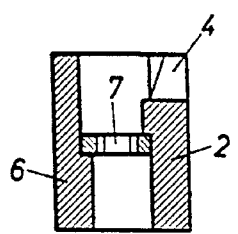
Figure 2E:
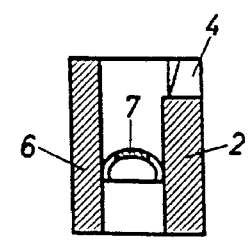
Figure 2F:
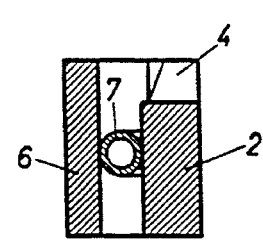
Figure 2C:
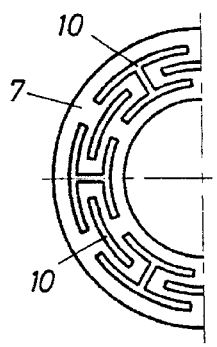
Figure 2E:
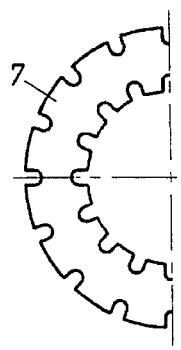
Figure 2F:
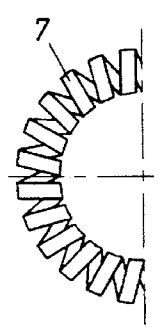

FIG. 2 shows several types of such elements, for example, simple disks (FIG. 2A), a stack of thin disks (FIG. 2B), or disks with perforations 10 of articulated contours, which are both axially and radially flexible (see FIG. 2C and the corresponding view from above in FIG. 2C*). Excellent thermal conduction accompanied by high flexibility is obtained by sealing a heat conducting fluid inside the hollow space 13 between two membranes 11 tightly connecting the pressure transmitting element 2 and the housing 6. Finally, the variants according to FIG. 2E and FIG. 2F and the corresponding views from above in FIG. 2E* and FIG. 2F* present "rolling" elements, preferably a helix as in FIG. 2F.

In all of the above variants heat may be transferred either directly into the region of the housing 6 which is radially opposite of the pressure transmitting element, or, by including a highly rigid, cylindrical part 8 of good thermal conductivity, for example, with no further specification, it could also be transported into regions of the sensor housing which are located at a greater distance from the heated part and therefore cooler.

Figure 3:
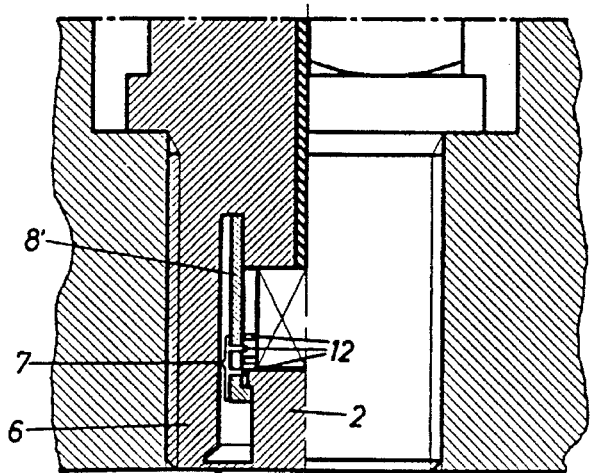
Figure 3A:
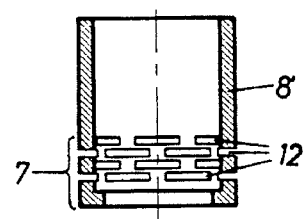

In FIG. 3 the axially flexible heat conducting element 7 exhibits a cylindrical region 8' of good thermal conductivity, such as a simple thick-walled cylinder, in which slits 12 are provided to form an element which includes flexible regions to minimize stresses on the heat conducting element as well as a rigid cylinder 8' to transfer heat to cooler regions of the sensor.

In sensors with preloaded measuring elements, such as piezocrystals, the flexible heat conducting element preferably is formed such that it will generate at least part of these preloading forces upon assembly. In the disk-shaped elements according to FIGS. 2A, 2B, 2C, for instance, this is achieved without impairing their function by manufacturing these elements as conical disk springs and compressing them into a flat shape upon assembly.

We claim:

1. Pressure sensor comprising a housing containing a measuring device which is separated from said housing by a radial gap and comprises a pressure transmitting element and a measuring element, said pressure sensor comprising a sealing membrane tightly and flexibly connecting said housing and said pressure transmitting element on a side facing a medium to be measured, wherein at least one heat conducting element is provided between said pressure transmitting element and said housing, said heat conducting element being made from a material of good thermal conductivity and having a large cross-section for heat conduction such that most of the heat arising in a region of said pressure transmitting element is carried off to said housing via said heat conducting element, acting as bending or rolling element in the instance of axial shifts between said pressure transmitting element and said housing and being flexible in axial direction as regards force transmission.

2. Pressure sensor according to claim 1, wherein said heat conducting element, which is flexible in an axial direction, is provided with an additional, rigid heat conducting element which serves to transfer heat to cooler regions of said housing.

3. Pressure sensor according to claim 2, wherein said heat conducting element has a cylindrical shape.

4. Pressure sensor according to claim 1, wherein said heat conducting element, which is flexible in an axial direction, comprises a cylindrical, rigid region with good heat conducting properties, which serves to transfer heat to cooler regions of said housing.

5. Pressure sensor according to claim 1, wherein said heat conducting element, which is axially flexible, is elastically deformed on assembly in an axial direction, and deformation forces generated thereby applying a preloading force on said measuring element.

6. Pressure sensor according to claim 1, wherein said heat conducting element consists of two membranes placed between said pressure transmitting element and said housing, forming a closed hollow space, said hollow space containing a heat conducting fluid.

* * * * *